Oct. 22, 1968 E. P. HABDAS 3,406,753

PEG TYPE HEAT EXCHANGERS FOR THERMOELECTRIC DEVICES

Filed Feb. 23, 1967

INVENTOR.
EDWARD P. HABDAS
BY Whittemore, Hulbert & Belknap
ATTORNEYS 3,406,753

PEG TYPE HEAT EXCHANGERS FOR THERMOELECTRIC DEVICES

Edward P. Habdas, Dearborn, Mich., assignor to Calumet & Hecla, Inc., Allen Park, Mich., a corporation of Michigan Continuation-in-part of application Ser. No. 272,888, Apr. 15, 1963. This application Feb. 23, 1967, Ser. No. 617,960
12 Claims. (Cl. 165—185)

ABSTRACT OF THE DISCLOSURE

A peg type heat exchanger comprising a metal rod adapted to be attached in good heat and electrical conducting relation to the end of one or more semiconductor pellets or to electrical conductors connecting a pair of pellets, a metal heat exchange sheath surrounding said rod, and a very thin layer of good heat conducting and electrically insulating material interposed between said rod and sheath in good heat conducting relation to both. For most applications the sheath is in the form of an integrally finned tube.

*Cross-reference to related application*

This application is a continuation-in-part of my copending application Ser. No. 272,888, filed Apr. 15, 1963.

*Background of the invention*

The theory of thermoelectric heat pumps has been known for over a hundred years, but in the last decade the improvement in efficiency of such heat pumps, due principally to the development of pellets formed from relatively new materials called "doped" semiconductors, has been very dramatic. One of the principal problems is the transfer of heat to and from corresponding cold and hot terminals of such thermoelectric pellets, and the problem has been complicated by the fact that the pellets themselves are necessarily electrically connected in series. Accordingly, one of the problems is to transfer heat from or to these pellets without introducing problems because of the fact that the pellets carry the electric current which serves as the source of power for the heat pump.

*Summary of the invention*

In accordance with the present invention heat transfer pegs are provided which consist of elongated metal bodies, preferably solid metal rods having at least one end exposed for direct connection to the end or ends of one or more pellets. In order to prevent current leakage or short circuits due to build-up of material on the pegs or accidental cross connection of pegs, each of the rods is surrounded by a generally tubular metal sheath. Intermediate the rod and sheath is a very thin layer of electrically insulating heat conducting material in good heat conducting relation both to the rod and the sheath. For most applications the metal sheath is provided with heat transfer fins, preferably in the form of integral fins.

It is an object of the present invention to provide a heat transfer peg having an extended heat transfer surface in good heat conducting relation to the end of a thermoelectric pellet, the heat dissipating exterior surface of the peg being electrically insulated from the pellet.

More specifically, it is an object of the present invention to provide a heat transfer peg comprising an elongated metal element preferably in the form of a solid metal rod, a metal sheath surrounding said rod laterally and providing an extended heat dissipating surface, and means interposed between said rod and sheath providing good electrical insulation and good heat transfer properties, the extended area of the heat conducting electrically insulating material interposed between the rod and sheath, in conjunction with the minimal thickness thereof providing an excellent overall heat transfer relationship.

It is a further object of the present invention to provide a peg as described in the preceding paragraph in which the sheath is provided with heat transfer fins and preferably with integral helical fins.

Other objects and features of the invention will become apparent as the description proceeds, especially when taken in conjunction with the accompanying drawings, illustrating preferred embodiments of the invention.

*Description of the preferred embodiments*

Figure 1:
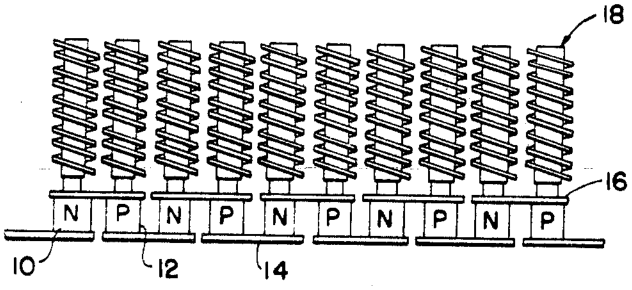
FIGURE 1 is a schematic elevational view showing heat pegs associated with pellets of a thermoelectric heat pump.

Referring first to FIGURE 1 there is diagrammatically shown a thermoelectric heat pump of known type provided with the improved peg type heat exchangers. The thermoelectric heat pump comprises a plurality of semiconductor pellets, alternate pellets as indicated at 10 being of N type as indicated in the figure, and the remaining alternate pellets 12 being of P type. Bottom electrical connectors 14 and top electric connectors 16 are provided, the connectors 14 and 16 connecting different pairs of pellets so that a continuous series electrical circuit is provided through all of the pellets.

In accordance with well understood principles, when an electric current is passed in one direction through the assembly of pellets, corresponding ends of all pellets, as for example the upper ends in FIGURE 1, are cooled, whereas the lower ends of the pellets are heated by the Peltier effect.

In order to make a practical use of the cooling effect at the upper ends of the semiconductor pellets, it is essential to provide for heat transfer in an efficient manner. In accordance with the present invention heat exchange pegs 18 are provided and these pegs may be individually related to each semiconductor pellet 10 or 12 as illustrated in FIGURE 1. It is preferable however, to utilize a peg with transverse elongation as will subsequently be described in connection with FIGURES 5–7, so as to be associated with a pair of such pellets. This transverse elongation of the peg permits each peg to serve as the electrical connector as well as the means for transferring heat to or from the associated pair of pellets. The transverse elongated peg associated with two adjacent pellets has additional advantages over the individually related pegs. In the first place two solder joints are eliminated per couple junction since the pellets 10 and 12 are soldered directly to a single peg. The connector resistance is reduced since a relatively thin connector strap 16 is replaced by the peg, providing a path of substantially decreased electrical resistance. The cross-sectional area of one peg perpendicular to the direction of heat flow is greater than the area of two circular cross-section pegs, thus increasing thermal conductance.

Figure 2:
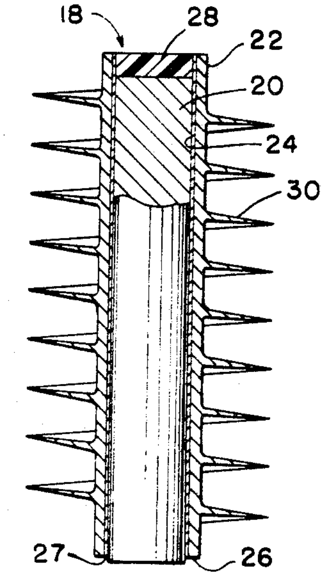
FIGURE 2 is an enlarged sectional view of one of the pegs.

Referring now to FIGURE 2, one of the heat exchange pegs is illustrated as comprising an inner metal rod 20 which is preferably solid as shown and which may be circular, oval, or rectangular with radiused or semicircular ends. Surrounding the rod 20 is a metal sheath 22 and interposed between the rod 20 and the sheath 22 is an extremely thin layer of electrically insulating thermally conducting material 24. The material 24 is in firm contact with the outer surface of the rod 20 and the inner surface of the sheath 22 and hence, is in good thermally conducting relation thereto. It will be observed of course that there is a relatively great area of the heat conducting material intermediate the rod 20 and the sheath 22, thus providing maximum heat conductance.

Conveniently, the rod 20 may be formed of aluminum or copper and the sheath 22 may likewise be formed of the same metal. The electrically insulating thermally conducting layer 24 is a material selected because of its efficient electrical insulation properties and its ability to transfer heat by conductance. Metal oxides have been found particularly useful and good results have been obtained employing oxides of aluminum, titanium, silicon, magnesium and zirconium. The insulating layer must be perfectly continuous so as to constitute an effective insulator and it is as thin as possible while preserving its integrity. Where the layer is provided in the form of a finely powdered metal oxide, the layer is as thin as possible. Excellent results have been obtained where the peg unit is formed from aluminum rod which is hard anodized to provide a tightly adhered or integrated film or coating of aluminum oxide having a thickness of between .0005 and .0030 inch. This film provides further electrical insulation and offers a minimum of resistance to heat flow. Moreover, it lends itself to an operation in which the tubular sheath is most effectively interconnected therewith. Since the anodized film or coating is in effect a permanent integral portion of the aluminum rod, it is possible to provide a tubular metal sheath over the anodized rod and thereafter by drawing, roll reducing, magnetic forming, or otherwise, to reduce the diameter of the tubular sheath so that it is in firm intimate contact with the aluminum oxide layer. In the case of the hard coat anodized rod it is not desirable to reduce its diameter as the anodized coating is relatively hard and brittle, and may crack if subjected to elongation or reduction. The cracks become points of possible electrical breakdown. Still another way of providing thin layers of the metallic oxide insulating material may be by thermal evaporation or sputtering techniques.

The lower end of the sheath is caused to terminate slightly above the bottom end of the rod as indicated at 26 so as to leave the lower portion 27 of the rod exposed and thus to permit attachment of the peg by soldering or the like to one or more semi-conductor pellets without completing an electrical circuit to the insulated sheath. The opposite end of the peg assembly is preferably sealed, as for example by a plastic plug 28. The metal sheath 22, as seen in FIGURE 2, is in the form of an integrally helically finned tube having the helically extending fin structure 30 thereon. Alternatively of course, fins may be separately applied to the tubular sheath.

Referring again to FIGURE 1, the heat exchange pegs are individually applied to the copper connectors 16 in alignment with a corresponding pellet 10 or 12.

In producing the individual heat peg assemblies the tubular sheath is provided over the elongated rod 20 with appreciable clearance therebetween. This clearance space may then be filled with powdered electrically insulated thermal conducting material such for example as one of the metallic oxides previously referred to. Thereafter, the diameter of the sheath may be reduced by swaging, magnetic forming, or the like. If the sheath, as is contemplated herein for some applications, is not provided with the external fins, the sheath may be reduced by drawing, roll reducing, or the like. In any case, the metallic oxide when subjected to compression as a reduction of the sheath, becomes a rock-like film which may have a thickness as small as .001 inch. The sheathed rod is then cut to the required length and the sheath at one end is stripped for a distance from 3/32 to 1/8 inch, as illustrated at 27 in FIGURE 2.

Great care must be exercised to provide a perfectly continuous layer or film of the metallic oxide. In accordance with one embodiment of the persent invention, this layer of metallic oxide may be provided on the rod as a continuous bonded film by thermal evaporation or sputtering. Thermal evaporation of the metallic oxide may take place in a vacuum chamber through which the rod is advanced, preferably accompanied by rotation of the rod. Individual molecules of the powdered metallic oxide deposit on the surface of the rod and become permanently bonded thereto. The layer of metallic oxide may be built-up to any required thickness, but in general it is possible to provide perfectly continuous film having a thickness corresponding to one or a limited number of molecules. A similar technique is the application of the material by sputtering, in which larger particles of the metallic oxide are sputtered from an electrode and deposited on the rod, also in a vacuum chamber.

Metallic oxide films applied by thermal evaporation or sputtering are molecularly bonded to the rod and the rod may be provided with a tubular sheath after which the sheath may be reduced in diameter to provide perfectly firm continuous contact with the outer surface of the metallic oxide, preferably by an operation which results in a good contact by actually reducing the diameter of the assembly including the rod.

Figure 3:
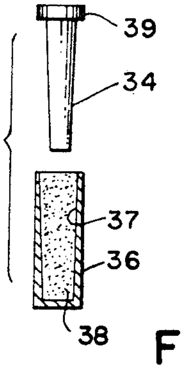
FIGURE 3 is an exploded view of a rod element and sheath.
Figures 4, 7:
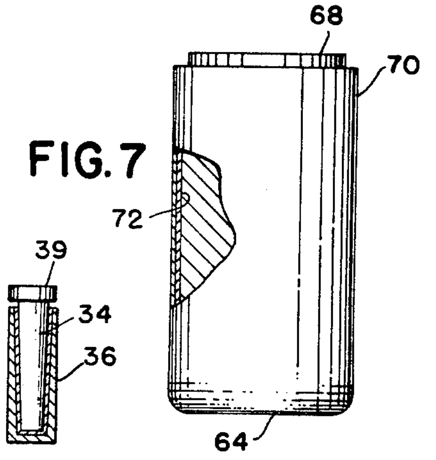
FIGURE 4 is a view of the rod and sheath shown in FIGURE 3 after assembly.
FIGURE 7 is an elevational view with parts broken away, of another of the heat pegs associated with the unit of FIGURE 5.

An alternative method of providing the insulating layer of metallic oxide intermediate the rod and sheath is illustrated in FIGURES 3 and 4 where the rod 34 and sheath 36 are initially provided with a slight corresponding taper. The taper in these elements may be provided by casting, cold extrusion, or machining. The cavity 37 within the sheath is filled or partly filled with finely powdered metallic oxide, preferably aluminum oxide or magnesium oxide as indicated at 38, and thereafter the tapered peg is pressed into the sheath as indicated in FIGURE 4, under extremely high pressure. The excess metallic oxide is expelled from the cavity 37 as the rod 34 is inserted and in some cases an opening may be provided at the bottom of the sheath 36. In this case the rod 34 is provided with a laterally enlarged head 39 which provides the exposed but insulated end of the peg assembly which may be soldered to the end of the conducting straps or connectors 16 as previously described.

Where the peg is as illustrated in FIGURE 2 except for the provision of the external fins 30, it may be produced by inserting individual rods 20 into sheath tubes 22 with considerable clearance. The gap or space between the sheath and rod is filled with powdered oxide such for example as aluminum or magnesium oxide. In order to provide substantially complete filling of this relatively narrow space vibration may be employed, or in some cases the powdered oxide may be carried through the space in an air current and filtered therefrom at the end from which the air exits. With this arrangement the powdered oxide will build up progressively from one end of the tube towards the end at which the powdered oxide is introduced. The end of the tube is now pointed so that it will go through a properly sized draw die and the assembly drawn through a die on a drawbench in lengths of approximately 20 feet. It will of course be appreciated that the space intermediate the rod and sheath may be relatively great where the starting material is of relatively short length and is intended to undergo substantial reduction.

Following the foregoing, the next operation is a precision cut-off as by sawing and end treatment. The rod is cut into lengths of approximately 2 inches, after which approximately ⅛ inch of the outer sheath is stripped from one end and the rod is or may be countersunk in the tube at the other end to provide for the plastic sealing plug 28. This stripping operation of one end and countersinking of the other end may be replaced by one pressing operation which pushes the central rod down approximately ⅛ inch. This operation simultaneously provides for the exposed portion 27 of the rod and plastic sealing 28.

Figure 5:
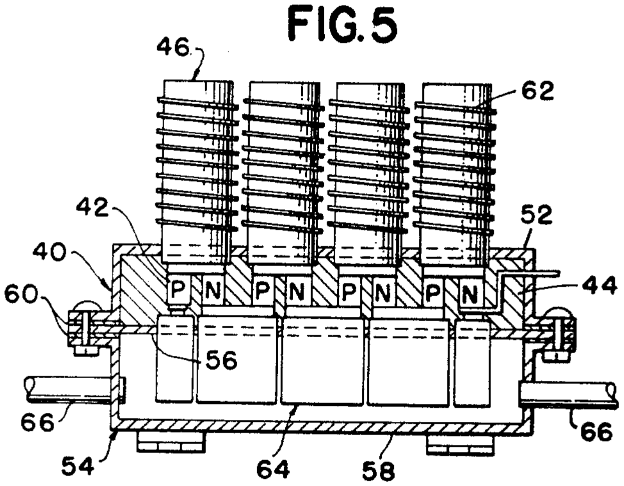
FIGURE 5 is a sectional view through a heat pump unit.
Figure 6:
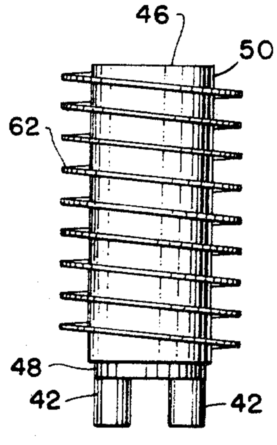
FIGURE 6 is an enlarged elevational view of one of the heat pegs of the unit shown in FIGURE 5.

Referring now to FIGURE 5 there is illustrated a thermoelectric heat pump provided with two different peg type heat transfer units in accordance with the present invention. As seen in this figure the thermoelectric heat pump module indicated generally at 40 comprises a multiplicity of N and P type pellets 42 disposed in physical parallelism and electrically connected in series at the tops and bottoms by properly shaped and disposed heat pegs, or more particularly, to the inner rod portions thereof, as will presently appear. The semiconductor pellets 42 are assembled together in a suitable thermal insulation material 44 such as a foamed plastic which provides excellent thermal insulation between the hot and cold sides of the module. In the illustrated embodiment, the semiconductor terminals at the top are the cold terminals and the heat transfer assembly formed thereby is accordingly cooled and operates to cool air circulated therethrough, as for example horizontally, across and between the individual pegs 46. The heat transfer pegs 46 are of transversely elongated cross-section and comprise the transversely elongated metal rod 48 and the metal sheath 50 which is mechanically connected to the peg 46 by the interposed layer of electrically insulated heat conducting material as previously described. The lower end of the rod 48 is exposed as seen in FIGURE 6 and soldered or equivalently connected to a pair of semiconductor pellets 42. The sheath 50 of each of these peg assemblies extends through an opening in a cover 52 of a housing assembly indicated generally at 54, which includes a partition 56 and a lower portion 58. Thermal insulation 60 is included between the cover 52, the partition 56, and the lower portion 58 all around the housing to reduce thermal conductance between the hot and cold sides of the module. The peg assemblies 46 are provided with individual fin structures 62.

Inasmuch as the pellets 42 are arranged as a block there are cases in which the transversely elongated pegs 46 are not applicable, in which case a single peg of the type shown in FIGURE 2 may be employed, and the adjacent pellets interconnected by conductor straps of the type illustrated at 16 in FIGURE 1.

Inasmuch as the lower end of the pellets 42 are the hot ends from which it is required to remove heat, it is possible to employ unfinned heat transfer pegs 64 of the type illustrated in detail in FIGURE 7. These extend through the partition 56 and have the upper exposed ends of rod portions thereof soldered or otherwise secured to the ends of two adjacent pellets. Heat is removed from the heat transfer pegs 64 by circulating cooling water through inlet and outlet conduits 66. As best seen in FIGURE 7 the peg 64 comprises a transversely elongated metal rod 68 dimensioned to fit over the ends of an adjacent pair of pellets. The rod 68 is surrounded by a smooth surfaced tubular sheath 70 and intermediate the rod 68 and sheath 70 is a continuous layer of electrically insulating thermally conducting material 72 which may be of the type previously described. Inasmuch as efficient heat transfer takes place from the extended area of the prime surface tubes or sheaths 70, the provision of heat exchange fins at this point is unnecessary.

The constructions disclosed herein are characterized by the relatively large cross-sectional area of the electrically insulating thermally conducting material through which the heat flux must pass. This in turn results in a considerable reduction in the temperature differential across this thermal barrier.

The drawing and the foregoing specification constitute a description of the improved peg type heat exchangers for thermoelectric devices in such full, clear, concise and exact terms as to enable any person skilled in the art to practice the invention, the scope of which is indicated by the appended claims.

What I claim as my invention is:

1. Heat flow pegs for use with a thermoelectric heat pump comprising a plurality of pellets of semiconducting material, each of said pegs comprising an elongated metal rod, a metal sheath laterally surrounding said rod and electrically insulated therefrom, the insulation being provided by a continuous layer of an electrically insulating, heat conducting material in good heat conducting relation to both of said rod and said sheath, one end of each of said rods being exposed by the sheath associated therewith to provide for bonding each of said rods to at least one of the pellets without contact between said sheath and the pellet, said sheaths comprising individually finned metal tubes, the insulation between the rods and sheaths preventing short circuiting resulting from electrical connections between fins of adjacent sheaths.

2. Structure as defined in claim 1 in which the exposed ends of said rods extend longitudinally beyond the sheath associated therewith.

3. Structure as defined in claim 1 in which said layer is an oxide of a metal selected from the group consisting of aluminum, magnesium, titanium, silicon, and zirconium.

4. Structure as defined in claim 1 in which said layer is a metal oxide and has a thickness of not more than a few thousandths of an inch.

5. Structure as defined in claim 1 in which said rods are aluminum and said insulating layers are anodized films of aluminum oxide.

6. Structure as defined in claim 5 in which said films have a thickness of .0005–.0030 inch.

7. Heat exchange pegs for attachment to semiconductive pellets of a thermoelectric heat pump, each peg comprising a metal rod having a length exceeding its major transverse dimension, a metal sheath laterally surrounding said rod, a continuous layer of electrically insulating, heat conducting material between said rod and sheath in good heat conducting relation to both said rod and sheath, said sheath exposing one end of said rod for direct connection to the end surface of one or a pair of pellets.

8. A peg as defined in claim 7 in which said rod is transversely elongated and adapted to have end contact with a pair of adjacent pellets.

9. A peg as defined in claim 7 in which said layer is an oxide of a metal selected from the group consisting of aluminum, magnesium, titanium, silicon, and zirconium.

10. A peg as defined in claim 7 in which said layer is a metal oxide and has a thickness of not more than a few thousandths of an inch.

11. A peg as defined in claim 7 in which said rod is aluminum and said insulating layer is an anodized film of aluminum oxide.

12. A peg as defined in claim 11 in which said film has a thickness of .0005–.0030 inch.

No references cited.

ROBERT A. O'LEARY, *Primary Examiner.*

C. SUKALO, *Assistant Examiner.*